Figure 1:
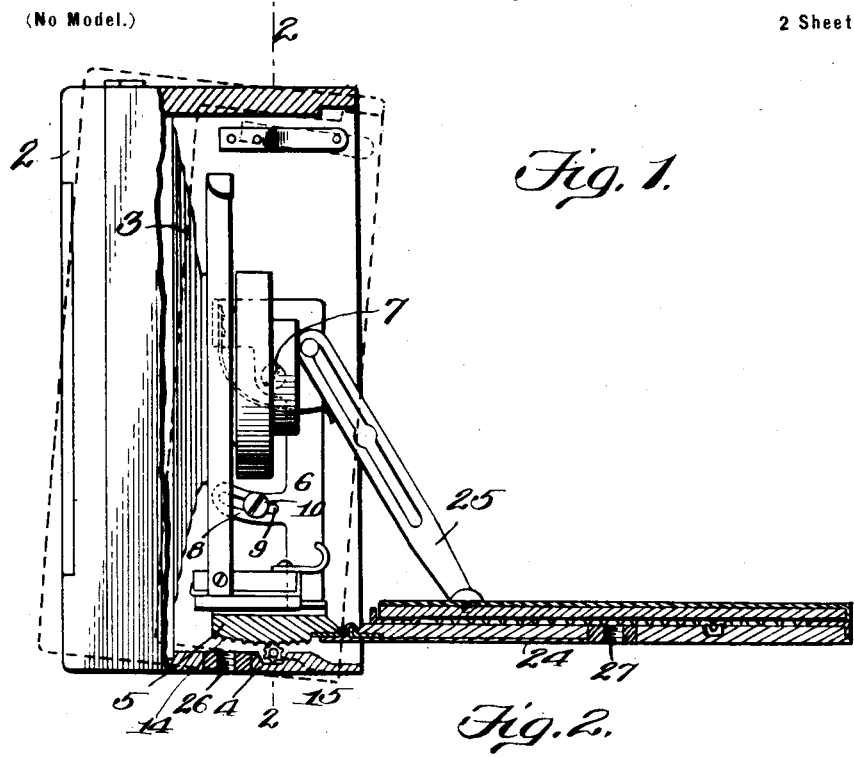

No. 712,301. Patented Oct. 28, 1902.
C. E. HUTCHINGS.
SWING BACK PHOTOGRAPHIC CAMERA.
(Application filed Apr. 4, 1902.)

(No Model.) 2 Sheets—Sheet 1.

Witnesses:

Inventor
Charles E. Hutchings
By James L. Norris.
Atty.

THE NORRIS PETERS CO., PHOTO-LITHO., WASHINGTON, D. C.

No. 712,301. Patented Oct. 28, 1902.
C. E. HUTCHINGS.
SWING BACK PHOTOGRAPHIC CAMERA.
(Application filed Apr. 4, 1902.)
(No Model.) 2 Sheets—Sheet 2.
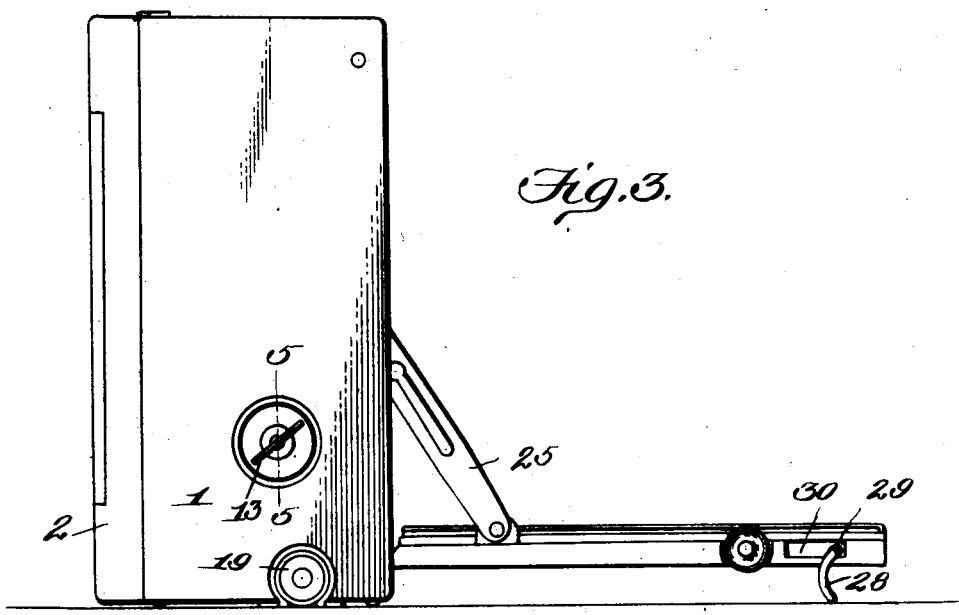
Fig. 3.
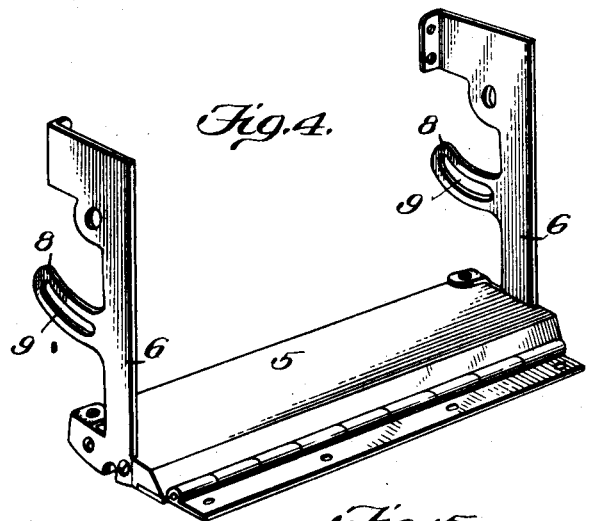
Fig. 4.
Fig. 5.
Witnesses:
Inventor
Charles E. Hutchings
By
James L. Norris
Atty.

UNITED STATES PATENT OFFICE.

CHARLES E. HUTCHINGS, OF ROCHESTER, NEW YORK, ASSIGNOR TO ROCHESTER OPTICAL AND CAMERA COMPANY, OF ROCHESTER, NEW YORK, A CORPORATION OF NEW YORK.

SWING-BACK PHOTOGRAPHIC CAMERA.

SPECIFICATION forming part of Letters Patent No. 712,301, dated October 28, 1902.

Application filed April 4, 1902. Serial No. 101,398. (No model.)

*To all whom it may concern:*

Be it known that I, CHARLES E. HUTCHINGS, a citizen of the United States, residing at Rochester, in the county of Monroe and State of New York, have invented new and useful Improvements in Swing-Back Photographic Cameras, of which the following is a specification.

In that class of photographic cameras known as "swing-back" cameras, in which the camera box or back is capable of swinging movement with respect to the bed on which the camera-front is mounted or in which the bed carrying the camera-front is capable of swinging movement with respect to the camera box or back for the purpose of enabling a tall object being photographed to appear in the picture in proper perspective difficulty has been experienced in determining when the two parts have been returned to their normal positions. This difficulty is due to the fact that the front cover of the camera-box, which constitutes the bed when swung to its open position, is hinged to a cross-bar in the camera-box and moves with said cross-bar during the swinging movements of said bed and said box with respect to each other. As the relative positions of the hinge on which said cover is mounted and the camera-box change, it is necessary that said hinge be restored to its proper position with respect to said box in order that the cover when closed may properly register with and fit within the open front of said box.

My invention is designed to overcome the difficulty above noted; and it consists of a camera-box, supports on which said box is pivoted, means for swinging one of said parts with respect to the other on the pivotal connection between the two, a lock for retaining said parts against relative swinging movement when they are in normal position, which lock is inoperative when one of said parts is swung away from its normal position with respect to the other, and a cover for the front of the box pivotally connected with said supports adapted to be locked in open position thereto and constituting the camera-bed when in its open position.

The invention also consists in certain features and details of construction and combinations of parts, which will be hereinafter more fully described and claimed.

Figure 2:
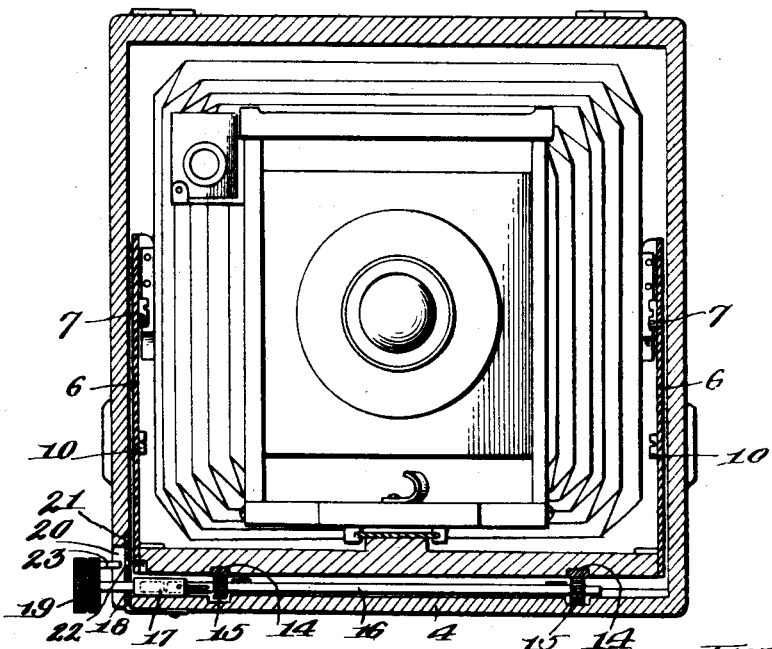

In the drawings forming part of this specification, Figure 1 is a sectional elevation of a camera embodying my improvements, showing in dotted lines one position to which the swing-back may be moved with respect to the bed. Fig. 2 is a cross-section on the line 2 2 of Fig. 1. Fig. 3 is a side elevation of the camera shown supported on a flat surface. Fig. 4 is a detail perspective view of the supports for the camera-box, the cross-bar connecting the same, and the piano-hinge by which the bed is connected to said cross-bar; and Fig. 5 is a detail sectional view on the line 5 5 of Fig. 3.

Like reference-numerals indicate like parts in the different views.

The swing-back 1, which constitutes the camera-box, is provided with closed sides, top, and bottom and with a removable back frame 2. It also has connected with it the ordinary bellows 3, attached at its forward end to the camera-front. Located within the box 1, slightly above the bottom 4 thereof, is a cross-bar 5, the same having secured to its opposite ends the parallel uprights or supports 6, pivoted at 7 to the sides of said box. The pivots 7 are preferably located in line with the center of the photographic plate or other sensitive surface carried by the box for an obvious purpose. The box 1 and the cross-bar 5 are capable of swinging movement with respect to each other on the pivots 7. To provide for locking these parts together in any position to which they may be adjusted, the uprights or supports 6 are formed with lateral arms or extensions 8, projecting toward the rear of the camera and provided with elongated segmental slots 9. These slots 9 register with circular openings in the sides of the camera-box and have extending through them and through said openings headed screws 10, having shouldered ribs or projections 11 thereon which fit within the slots 9, so that the turning movement of said screws is prevented. The heads of said screws are located on the inside of the camera-box, whereas the threaded shanks thereof project through the openings in the sides and have fitting thereon the thumb-nuts 12. Said thumb-nuts are seated in recesses formed in the outer surfaces of the sides and are preferably provided with wings 13, by means of which they may be turned. It will be obvious by this construction that upon loosening the thumb-nuts 12 the box 1 may be swung on the pivots 7 in one direction or the other, but that when said thumb-nuts are tightened the box 1 and the cross-bar 5 will be locked against swinging movement with respect to each other on the pivots 7.

The cross-bar 5 is provided on its under side with segmental racks 14, with which mesh the pinions 15, secured to a rotary shaft 16, mounted in suitable bearings in the sides of the camera-box, as clearly shown. By this construction it will be seen that when the shaft 16 is turned in one direction or the other the cross-bar 5 will be swung on the pivots 7 with respect to the box 1 or the box 1 will be swung on the pivots 7 with respect to the cross-bar 5, according to which one of these two parts is fixed in position.

The construction above described is old and well known, forms no part of my present invention, and no claim herein is based thereon. The improvements made by me will now be described.

Splined upon one end of the shaft 16, so that the same is capable of longitudinal movement on said shaft, is a sleeve 17, which projects through an opening 18 in one side of the camera-box and is provided with a handle 19. The said handle has been shown in the form of a circular milled head which normally fits within a correspondingly-shaped recess 20 in the side of the camera-box. The inner or bottom wall of the recess 20 is covered or formed by a plate 21, having an opening 22 therein adapted to receive an eccentrically-mounted pin or projection 23 on the milled head 19.

The opening 22 in the plate 21, which receives the pin 23 on the head 19, is so disposed with respect to said pin or said pin is so disposed with respect to said opening that when these two parts are in interlocking engagement with each other turning movement of the shaft 16 is prevented, and the cross-bar 5 will be held in a position at right angles to the back of the camera-box 1 and parallel to the bottom thereof, this being the normal position of said parts. The pin 23, and the opening in which it fits, therefore, constitute a lock for maintaining the cross-bar 5 or the supports 6 and the box 1 in their normal positions, the said lock being inoperative when either of said parts is swung away from its normal position with respect to the other, as the pin 23 moves out of alinement with the opening 22. The importance of this construction will be readily understood when it is noted that the cover 24 for the front of the camera-box, which constitutes the bed when the same is moved to its open position, is hinged to the forward edge of the cross-bar 5 and is locked in open position to said cross-bar by the links 25. The camera-box 1 is capable of swinging movement on the pivots 7 with respect to said cross-bar 5, supports 6, and bed 24, or said cross-bar, supports, and bed are capable of swinging movement on said pivots with respect to said box 1. As the positions of the camera-box 1 are capable of change with respect to the bed 24 of the camera and as said bed to act as a cover for the front of the camera-box must properly register with the open front of said box when the camera is in its closed position, it will be seen that it is absolutely necessary for the bed 24 and the box 1 to be returned to their normal positions before said bed can be moved to its closed position to act as a cover. The normal positions of these parts may be determined by the registration of the pin 23 with the opening 22 in the plate 21.

The bottom 4 of the swing-back or camera-box 1 is provided with a threaded opening 26 for the attachment of the camera to a tripod, and the cover or bed 24 is provided with a similar opening 27 for the attachment of the device to a tripod. The camera may also be supported, if desired, upon a table or other flat surface. When so supported, however, the box 1 is swung on the pivots 7 with respect to the bed or the bed is swung on the pivots 7 with respect to the box and the outer end of the bed is raised, it is important that additional or supplemental supports therefor be provided. To serve as such supplemental supports, I have connected to the opposite side edges of the bed or cover 25, adjacent to its outer or upper end, the legs 28. These legs are provided with shanks 29, which fit within openings in the edge of the bed or cover 25 and are capable of longitudinal and swinging movement therein. When said legs are in closed position, they fit within recesses 30, formed in the side edges of the bed or cover 25, so that they are out of the way and do not project appreciably beyond the surface of the bed or cover. To move the same into their operative positions for the purpose of supporting the outer free end of the bed when the camera is placed upon a table or other flat support, the shanks of said legs are moved outwardly in the openings in the bed or cover in which they fit, and said legs are then swung downwardly, as clearly shown.

The normal position of the sleeve 17 on the shaft 16 when the camera is closed is with the milled head or button 19 thereon forced inwardly and seated within the recess 20 in one side of the camera-box. At such time the pin 23 on said head fits within the opening 22 in the plate 21, and the cross-bar 5 and the camera-box 1 are locked against swinging movement with respect to each other. When, however, it is desired to swing one of these parts with respect to the other for the purpose of properly photographing a tall object, the sleeve 17 is moved outwardly on the shaft 16, which action removes the milled head 19 from the recess 20 in which it fits, so as to render the same accessible to the operator, and withdraws the pin 23 on said milled head from the opening 22 in the plate 21 in which it fits. The shaft 16 is then free to be rotated in one direction or the other, it being assumed that the frictional locking mechanism, consisting of the slotted arms 8 on the uprights or supports 6 and the headed screws 10 and thumb-nuts 12, coöperating therewith, have been released. By turning the milled head 19 in one direction or the other the shaft 16 will be correspondingly turned, and the pinions 15 thereon in mesh with the segmental racks 14 on the under side of the cross-bar 5 will cause a relative swinging movement on the pivots 7 of the box 1 or the bed. If the camera is supported on a tripod directly from the camera-box 1 by means of the threaded opening 26 in the bottom 4, said camera-box will be held against movement and the rotation of the shaft 16 will cause the cross-bar 5 and the bed connected therewith to swing upon the pivots 7 with respect to said box 1. If, however, the camera is supported on a tripod directly from the bed or cover 25 by the engagement of the screw or bolt on said tripod with the threaded opening 27, the rotation of the shaft 16 will cause a swinging movement of the camera-box 1 with respect to the bed. In either case, however, the same results are obtained. When one or the other of these parts has been adjusted to the proper position, the same may be locked in such position by screwing up the thumb-nuts 12 on the headed screws 10, and thereby clamping the supports or uprights 6 to the sides of the camera-box. When it is desired to close the camera, it is necessary, as has been heretofore stated, to return the camera-box 1 and the cross-bar 5 to their normal positions with respect to each other. This is effected by releasing the thumb-nuts 12 and turning the milled head 19 on the sleeve 17, which causes a corresponding turning movement of the shaft 16 and of the parts connected and coöperating therewith until the pin 23 on said milled head registers with the opening 22 in the plate 21, when said sleeve 17 is forced inwardly, so as to cause the pin 23 to enter the opening 22. The parts are thereby locked in their normal positions, and the cover 25 may then be swung up and brought into proper relation to the front of the camera-box.

Having now described my invention, what I claim as new, and desire to secure by Letters Patent, is—

1. In a photographic camera, a camera-box, supports on which said box is pivoted, means for swinging one of said parts with respect to the other on the pivotal connection between the two, a lock for retaining said parts against relative swinging movement when in their normal position, which lock is inoperative when one of said parts is swung away from its normal position with respect to the other, and a cover for the front of the box, pivotally connected with said supports, adapted to be locked in its open position thereto, and constituting the camera-bed when in its open position.

2. In a photographic camera, a camera-box, supports to which said box is pivoted, a cover for the front of the box, pivotally connected with said supports, adapted to be locked in open position thereto and constituting the camera-bed when in its open position, a rack-and-pinion connection between said box and said supports, and a lock for said rack-and-pinion connection, the said lock being operative when said box and said supports are in their normal positions with respect to each other, and being inoperative when one of the latter parts is swung away from its normal position with respect to the other.

3. In a photographic camera, a camera-box, a frame within said box having supports to which said box is pivoted and a cross-piece between said supports, a cover for the front of the box, hinged to said cross-piece, adapted to be locked in its open position thereto and constituting the camera-bed when in its open position, a segmental rack on said cross-piece, a rotary shaft mounted in said box, a pinion carried by said shaft meshing with said rack, and a longitudinally-movable handle on said shaft having a projection thereon coöperating with a correlative part on said camera-box for locking said box and said frame in their normal positions with respect to each other.

4. In a photographic camera, a camera-box, a frame within said box having supports to which said box is pivoted and a cross-piece between said supports, a cover for the front of the box, hinged to said cross-piece, adapted to be locked in its open position thereto and constituting the camera-bed when in its open position, a segmental rack on said cross-piece, a rotary shaft mounted in said box, a pinion carried by said shaft meshing with said rack, a sleeve splined upon said shaft having a handle thereon fitting within a recess in the side of the camera-box and adapted to be moved longitudinally out of and back into said recess, and an eccentrically-mounted projection on said handle extending inwardly and adapted when seated in said recess to fit within an opening in the bottom wall of said recess, the said projection and the opening in which it fits constituting a lock for preventing the swinging movement of said box and said frame with respect to each other when the same are in their normal positions.

In testimony whereof I have hereunto set my hand in presence of two subscribing witnesses.

CHAS. E. HUTCHINGS.

Witnesses:
JOHN A. ROBERTSON,
GEO. W. REILLY.